No. 765,909. Patented July 26, 1904.

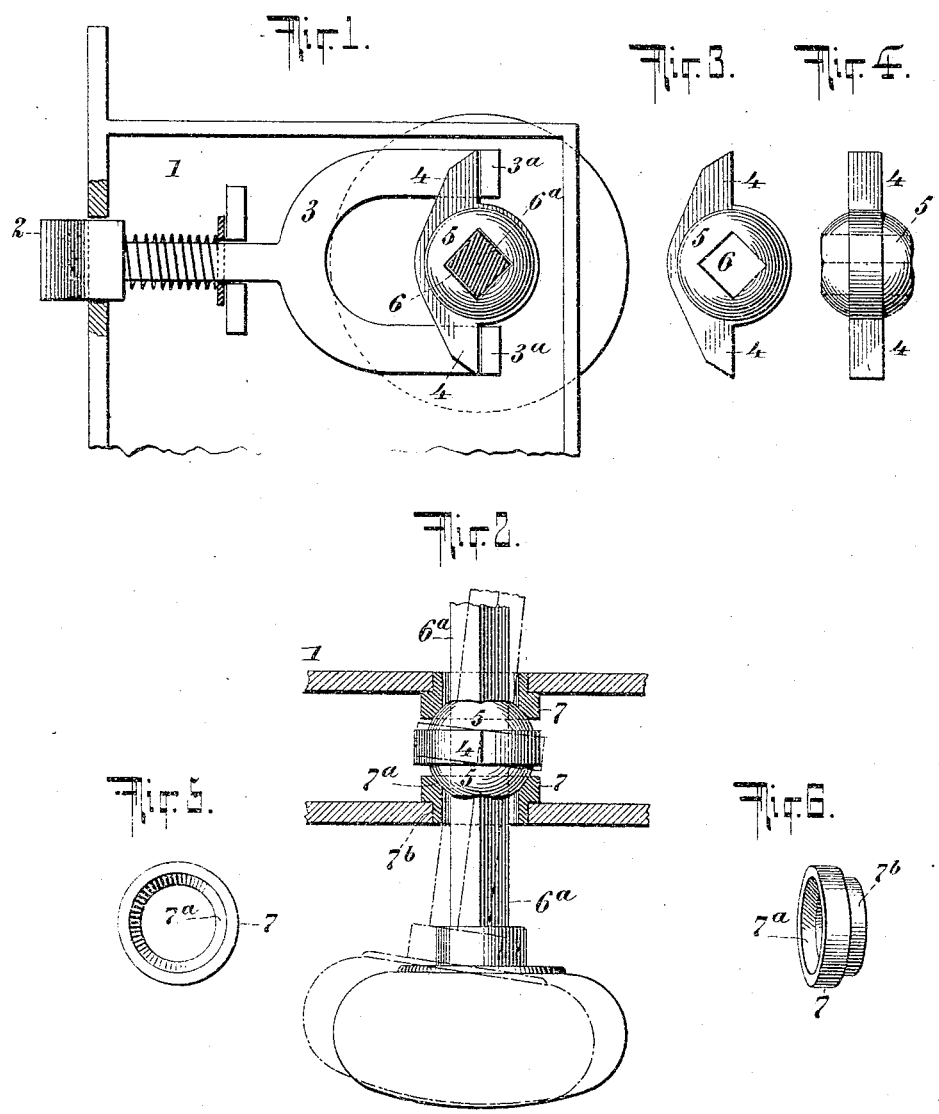

UNITED STATES PATENT OFFICE.

HENRY G. VOIGHT, OF NEW BRITAIN, CONNECTICUT, ASSIGNOR TO RUSSELL & ERWIN MANUFACTURING COMPANY, OF NEW BRITAIN, CONNECTICUT, A CORPORATION OF CONNECTICUT.

COMPENSATING HUB FOR LOCKS OR LATCHES.

SPECIFICATION forming part of Letters Patent No. 765,909, dated July 26, 1904.

Application filed May 6, 1904. Serial No. 206,605. (No model.)

*To all whom it may concern:*

Be it known that I, HENRY G. VOIGHT, a citizen of the United States, residing at New Britain, in the county of Hartford, State of Connecticut, have invented certain new and useful Improvements in Compensating Hubs for Locks or Latches, of which the following is a full, clear, and exact description.

My invention relates to locks and latches, and particularly to the hub.

My object is to provide in a lock or latch case a hub which may oscillate after the usual manner and which may be rocked or swung out of a line diametrical to the lock-case to a sufficient extent to prevent cramping or binding of the parts in use. When an ordinary mortise-lock is applied to a door, the lock-case is set into a mortise so arranged that the face-plate will lie flush with the edge of the door. Since some doors are provided with beveled edges, sometimes lock-cases are necessarily introduced in a plane oblique to the outer and inner surface thereof. In all cases, however, knob-spindles are passed through the door at right angles thereto, and consequently unless some loose play is provided when the knob-spindle is turned it is liable to produce a binding or cramping of the parts, impairing the free action of the lock.

The purpose of my invention, broadly, is to provide in a simple manner compensating means to avoid any possible undue cramping or binding.

In the drawings, Figure 1 is a conventional representation of a latch and part of a latch-case, showing the hub in place. Fig. 2 is a plan view of the hub, showing adjacent parts in section. Fig. 3 is a side elevation of the hub detached. Fig. 4 is a rear elevation of the hub. Fig. 5 is a front elevation of one of the bearings for the hub. Fig. 6 is a perspective view thereof.

1 is a portion of a lock-case.

2 is a latch.

3 is a latch-slide.

4 4 are roll-back arms coöperating with the latch-slide.

5 is a hub carrying said roll-backs, the ends of said hub being rounded or semispherical.

6 is a spindle-passage extending transversely through the hub 5 from end to end.

$6^a$ is a spindle. The roll-backs 4 4 are preferably formed integral with the hub 5.

The lock-case 1 is equipped with suitable hub supports or bearings 7 7 for the rounded ends of the hub 5. These bearings are annular and are cupped or rounded out, as at $7^a$. The bearings or supports 7 7 are preferably formed separately from the lock-case, but may be formed integrally therewith. When formed separately, these bearings 7 have reduced shank portions $7^b$ arranged to fit freely within the apertures in the lock-case. This arrangement is best seen in Fig. 2, and the dotted lines will indicate that the spindle may coöperate with the hub even though the same is connected therewith in such a manner as to stand at an oblique angle to the lock-case. Were no compensating means provided, if the spindle stood at the angle indicated in dotted lines it is apparent that the rotation of the spindle would produce a wedging or camming action on the roll-back or associated parts (even if it were possible to swing said spindle as far out of line as shown) and the freedom of action of the lock would be greatly impaired.

The bearings 7 when made separately from the lock-case may have free rotative movement therein. Since the hub itself is rotatably independent of the bearings 7, the utmost freedom of action and ease of operation is insured whether the spindle passes through the lock-case at right angles or at an oblique angle.

By the term "oscillate" as used in the following claims I refer to the usual motion which is given to a lock-hub by the turning of the spindle to draw the latch. By the term "rock" or "rocking" I refer to that capacity of the hub to swing so that a spindle which is passed obliquely through the lock may coöperate with the hub in such manner as to be entirely free.

What I claim is—

1. In a lock, an actuating-hub mounted to oscillate and to rock relatively to the lock-case, supports for the hub carried by said case and arranged to admit of said oscillating and rocking motion.

2. In a lock, an actuating-hub mounted to oscillate and to rock relatively to the lock-case, supports for the hub carried by said case and arranged to admit of said oscillating and rocking motion, and a spindle-passage through said hub transversely of the lock-case.

3. In a lock, an actuating-hub mounted to oscillate and to rock relatively to the lock-case, rotatable supports for the hub detachably carried by the lock-case and arranged to admit of oscillating and rocking motion of the hub relatively to said case as well as to said supports.

4. In a lock, a lock-case, an actuating-hub, supports on the inner side of said case to receive said hub and arranged to admit of an independent oscillating and rocking movement of said hub relatively to the lock-case and an arm projecting laterally of said hub.

5. In a lock, a lock-case, an actuating-hub, supports on the inner side of said case to receive said hub and arranged to admit of an independent oscillating and rocking movement of said hub relatively to the lock-case and roll-back arms projecting laterally of said hub and a spindle-passage through said hub at right angles to the plane of the roll-back arm.

6. In a lock, an actuating-hub having rounded ends, a roll-back arm carried by said hub between said rounded ends and a spindle-passage through said hub from end to end.

7. In a lock, an actuating-hub, the ends of said hub being rounded, two roll-back arms carried by said hub and oppositely extending therefrom and arranged between said ends, and a spindle-passage extending through said hub from end to end.

8. In a lock, a lock-case, an actuating-hub member arranged to be rotatably supported within said case, two independent cup-shaped hub-bearings carried by said case said hub having an oscillating and rocking movement relatively to said bearings.

9. In a lock, a latch, an actuating-hub adapted to be mounted to oscillate and rock relatively to the lock-case, substantially as described.

Signed at New Britain, Connecticut, this 4th day of May, 1904.

HENRY G. VOIGHT.

Witnesses:
M. S. WIARD,
E. M. NORTH.